(12) United States Patent
Foster et al.

(10) Patent No.: US 7,637,170 B2
(45) Date of Patent: Dec. 29, 2009

(54) LEAK CHECK DEVICE FOR VORTEX SENSOR REPLACEMENT

(75) Inventors: Jeffry D. Foster, St. Louis Park, MN (US); Christopher J. Brand, Shoreview, MN (US); William F. Graber, Eden Prairie, MN (US)

(73) Assignee: Rosemount Inc., Eden Prairie, MN (US)

( * ) Notice: Subject to any disclaimer, the term of this patent is extended or adjusted under 35 U.S.C. 154(b) by 68 days.

(21) Appl. No.: 11/855,362

(22) Filed: Sep. 14, 2007

(65) Prior Publication Data

US 2008/0216586 A1  Sep. 11, 2008

Related U.S. Application Data

(60) Provisional application No. 60/844,960, filed on Sep. 15, 2006.

(51) Int. Cl.
*G01F 1/32* (2006.01)
(52) U.S. Cl. .................................................. 73/861.22
(58) Field of Classification Search ............. 73/861.22, 73/861.24
See application file for complete search history.

(56) References Cited

U.S. PATENT DOCUMENTS

| | | | | |
|---|---|---|---|---|
| 5,343,762 | A | | 9/1994 | Beulke .................... 73/861.24 |
| 5,503,021 | A | * | 4/1996 | Lew ............................. 73/661 |
| 5,808,209 | A | * | 9/1998 | Zielinska et al. ......... 73/861.22 |
| 6,276,218 | B1 | * | 8/2001 | Waers ..................... 73/861.22 |
| 6,973,841 | B2 | | 12/2005 | Foster ..................... 73/861.22 |
| 6,988,418 | B2 | * | 1/2006 | Koudal et al. ............ 73/861.22 |
| 7,073,394 | B2 | * | 7/2006 | Foster ..................... 73/861.22 |
| 2005/0229715 | A1 | | 10/2005 | Foster ..................... 73/861.22 |

OTHER PUBLICATIONS

"Notification of Transmittal of the International Search Report and Written Opinion" for PCT/US2007/019970, Sep. 14, 2007.

\* cited by examiner

*Primary Examiner*—Jewel Thompson
(74) *Attorney, Agent, or Firm*—Westman, Champlin & Kelly, P.A.

(57) ABSTRACT

A vortex flowmeter measures process fluid flow. The vortex flowmeter includes a conduit that carries the process fluid. A sensing device is housed in a cavity of a sensor body that is coupled to the conduit. A flexure is disposed in a portion of the conduit. The flexure is configured to isolate the process fluid in the conduit from the sensing device. A pathway extends from the cavity to an outer surface of the sensor body.

18 Claims, 6 Drawing Sheets

LEAK CHECK DEVICE FOR VORTEX SENSOR REPLACEMENT

CROSS-REFERENCE TO RELATED APPLICATION

The present application is based on and claims the benefit of U.S. provisional patent application Ser. No. 60/844,960, filed Sep. 15, 2006, the content of which is hereby incorporated by reference in its entirety.

BACKGROUND

The present invention relates to vortex flowmeters. More specifically, the invention relates to vortex flowmeters for use with a pressurized process fluid.

Vortex flowmeters are commonly used in industrial processes to measure a flow of a process fluid, such as slurries, liquids, vapors and gases of chemicals, petroleum, pharmaceuticals, food and other fluid-type plant processes. Typically, vortex flowmeters utilize a shedding bar placed in a fluid flow to cause or generate vortices on opposite sides of the shedding bar. The frequency of vortex shedding for a shedding bar is directly is proportional to the velocity of flow in the process fluid. Therefore, vortex flowmeters sense the fluctuating pressures caused by the generated vortices to determine the velocity of the process fluid flow. Example vortex flowmeter implementations can be found in U.S. Pat. No. 4,926,695 to Rosemount, Inc. of Eden Prairie, Minn. on May 2, 1990, U.S. Pat. No. 5,343,762 to Rosemount, Inc. of Eden Prairie, Minn. on Sep. 6, 1994, both of which are commonly assigned with the present application.

Typically, a sensing device of a vortex flowmeter is coupled to, yet isolated from, the process fluid by a flexure. Often, a cavity is defined between the sensing device and the flexure. From time to time, a sensing device can fail. Since the sensing device is isolated from the process fluid by the flexure, the sensing device is replaceable without depressurizing the process fluid. However, replacing the sensing device while the process fluid is under pressure can be unsafe. In the event that the sensing device fails, it is impossible to know if the flexure that is in communication with the process fluid has also failed. If the flexure has also failed, pressurized process fluid will be contained in the cavity and upon removal of the sensing device can spray out.

SUMMARY

Embodiments of the disclosure are directed to a vortex flowmeter that measures process fluid flow. The vortex flowmeter includes a conduit that carries the process fluid. A sensing device is housed in a cavity of a sensor body that is coupled to the conduit. A flexure is disposed in a portion of the conduit. The flexure is configured to isolate the process fluid in the conduit from the sensing device. A pathway extends from the cavity to an outer surface of the sensor body. Disposed in the pathway includes a device extending from the cavity to an outer surface of the meter body, the device is configured for use in determining the presence of any process fluid in the cavity.

BRIEF DESCRIPTION OF THE DRAWINGS

FIGS. 6-1 and 6-2 are diagrammatic illustrations of the visual indicator illustrated in FIG. 5.

DETAILED DESCRIPTION

Figure 1:
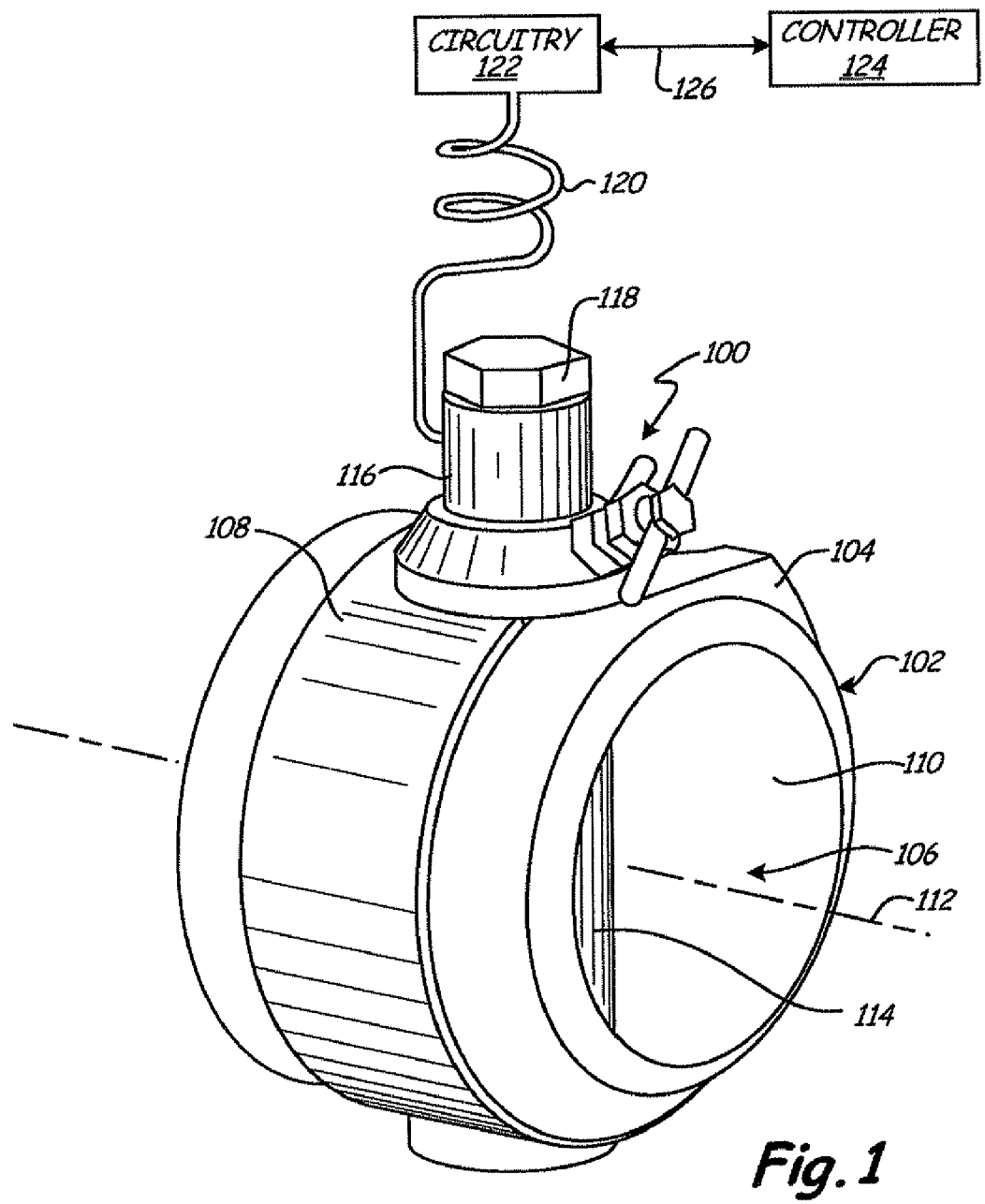
FIG. 1 is a perspective view of a flowmeter under one embodiment

Embodiments described herein are directed to vortex flowmeters, which are used to measure process fluid flow. Vortex flowmeters operate by utilizing a shedding bar placed in a process fluid flow that causes or generates vortices alternately on opposite sides of the shedding bar. The shedding bar causes variations in pressure on either of its sides. The frequency of vortices formed by the shedding bar is directly proportional to the velocity of flow in the process fluid FIG. 1 illustrates a partial view of a flowmeter 100 under one embodiment. Flowmeter 100 includes a conduit 102 having a conduit wall 104 surrounding a bore 106. Conduit 102 includes an exterior surface 108 and an interior surface 110. Bore 106 carries a process fluid, which can be a liquid or a gas, generally along a conduit axis 112. A shedding bar 114 is positioned in conduit 102 to act as a vortex-generating obstruction for the process fluid. Typically, shedding bar 114 includes an upstream extremity, a downstream extremity and an intermediate portion that couples the upstream extremity to the downstream extremity.

Positioned on exterior surface 108 of conduit 102 includes a sensor body 116. Sensor body 116 is configured to house a sensing device (not illustrated in FIG. 1) that can be removed via sensor nut 118. The sensing device housed in sensor body 116 generates an output and communicates the output via lead 120 to circuitry 122. Typically, circuitry 122 is adapted to communicate the output to a controller 124 via a communication link 126 (which can be a two-wire, three-wire or four-wire loop or a wireless communication link).

Figure 2:
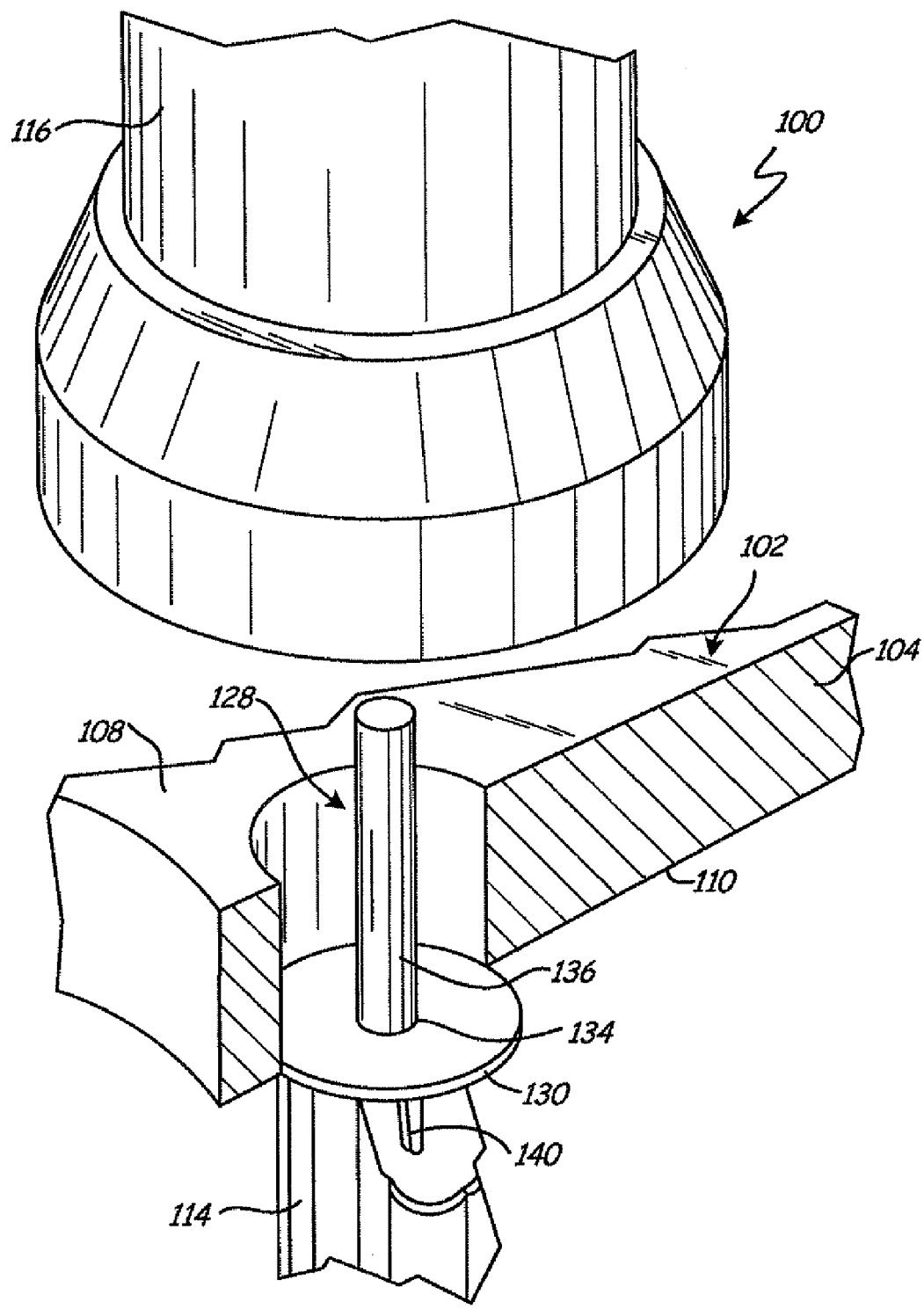
FIG. 2 is an enlarged and exploded partial view of the flowmeter illustrated in FIG. 1.

FIG. 2 is an enlarged and exploded partial view of flowmeter 100 illustrated in FIG. 1. Illustrated in FIG. 2 includes a partial view of sensor body 116 exploded from conduit wall 104. Conduit wall 104 includes a wall region of reduced thickness that is commonly referred to as a flexure 130 or as the intermediate portion of shedding bar 114 as discussed above. Flexure 130 flexes in response to disturbances or vortices within the process fluid created by process fluid flow around the upstream extremity (discussed above) to promote motion of at least a portion of the downstream extremity (discussed above).

Between an exterior surface 108 of conduit wall 104 and flexure 130 includes a hole 128 where flexure 130 is disposed for communication with the process fluid carried by conduit 102. The upstream extremity and the downstream extremity of shedding bar 114 are also in communication with process fluid carried by conduit 102. Flexure 130 is coupled to the downstream extremity or pivoting member 140 extending from flexure 130 into bore 106 of conduit 102. The fluctuating fluid pressures that act on the upstream extremity of shedding bar 114 moves the downstream extremity or pivoting member 140 in response to the fluctuating pressures. A post 136 couples flexure 130 to a sensing device (not illustrated in FIG. 2) housed in sensor body 116.

Figure 3:
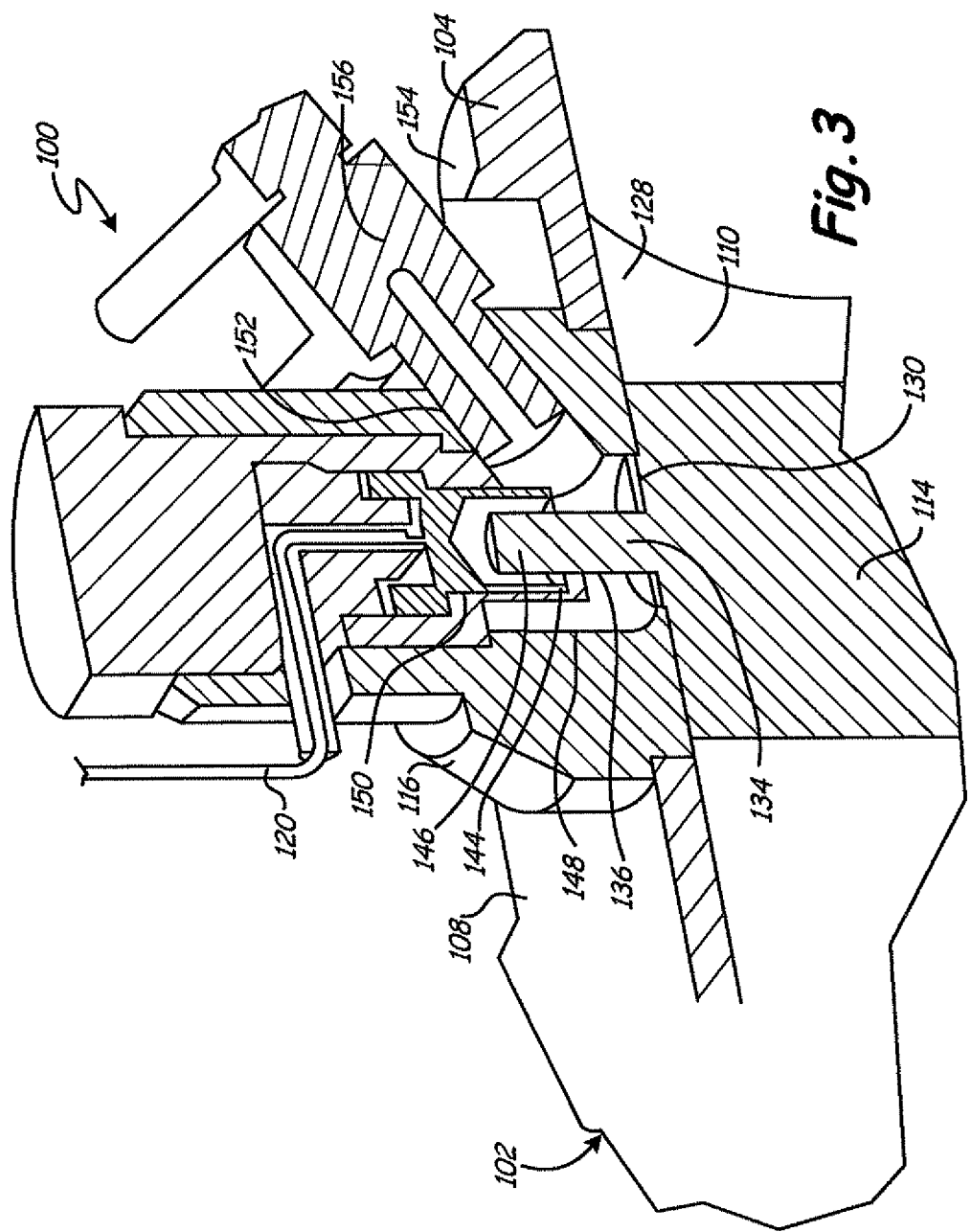
FIG. 3 is a partial sectional view of the flowmeter illustrated in FIG. 1.

FIG. 3 is a partial sectional view of flowmeter 100 illustrated in FIG. 1. As illustrated in FIG. 3, flowmeter 100 includes conduit 102 having conduit wall 104, hole 128 in conduit wall 104, sensor body 116, lead 120, shedding bar 114, flexure 130 and surface or post 136. Sensor body 116 is configured to house a sensing device 144. Sensing device 144 is coupled to flexure 130 by post 136 such that sensing device 144 is isolated from the process fluid in conduit 102. In particular, sensing device 144 is sealed to post 136 at an end opposite an end coupled to flexure 130. In one embodiment, sensing device 144 is sealed to post 136 with a c-ring seal 150. With the coupling of sensing device 144 to post 136 and flexure 130, sensing device 144 is able to sense the motion of pivoting member 140 (illustrated in FIG. 2) and therefore the fluctuating pressures in conduit 102. Sensing device 144 generates an output indicative of the sensed motion and communicates the sensed motion to circuitry 122 (FIG. 1) via lead 120 and ultimately to controller 124 (FIG. 1) via communication link 126 (FIG. 1).

Sensing device 144 is housed in a cavity 148 of sensor body 116. Cavity 148 is useful in the event that sensing device 144 fails. Since sensing device 144 is isolated from the process fluid in conduit 102, sensing device 144 can be removed and replaced without having to depressurize conduit 102. To remove sensing device 144, sensor nut 118 is removed, which holds c-ring seal 150 and sensing device 144 in place. However, replacing sensing device 144 while conduit 102 is under pressure can be unsafe. In the event that sensing device 144 fails, it is impossible to know if flexure 130 that is in communication with the process fluid and pivoting member 140 has also failed. Therefore, it would be useful determine whether flexure 130 is intact before replacing sensing device 144.

Under one embodiment and as illustrated in FIG. 3, flowmeter 100 includes a pathway 152. Pathway 152 extends from cavity 148 to an outer surface 154 of sensor body 116. Flowmeter 100 includes a valve body 156 disposed in pathway 152. Valve body 156 is configured in a closed position (normally shut) during normal operation of flowmeter 100. However, valve body 156 is configured in an opened position for detecting whether at least some of the process fluid is being improperly contained in cavity 148. In other words, during the process of changing sensing device 144, a user can safely open the valve body 156 to determine if process fluid exists in cavity 148. If process fluid is detected in cavity 148, then the user would shut the valve body 156 and proceed with depressurizing conduit 102 to change sensing device 144. Fluid in cavity 148 means that flexure 130 is leaking and has also failed. If, however, process is fluid is not detected in cavity 148, then the user can proceed with changing sensing device 144 without needing to depressurize conduit 102.

Figure 4:
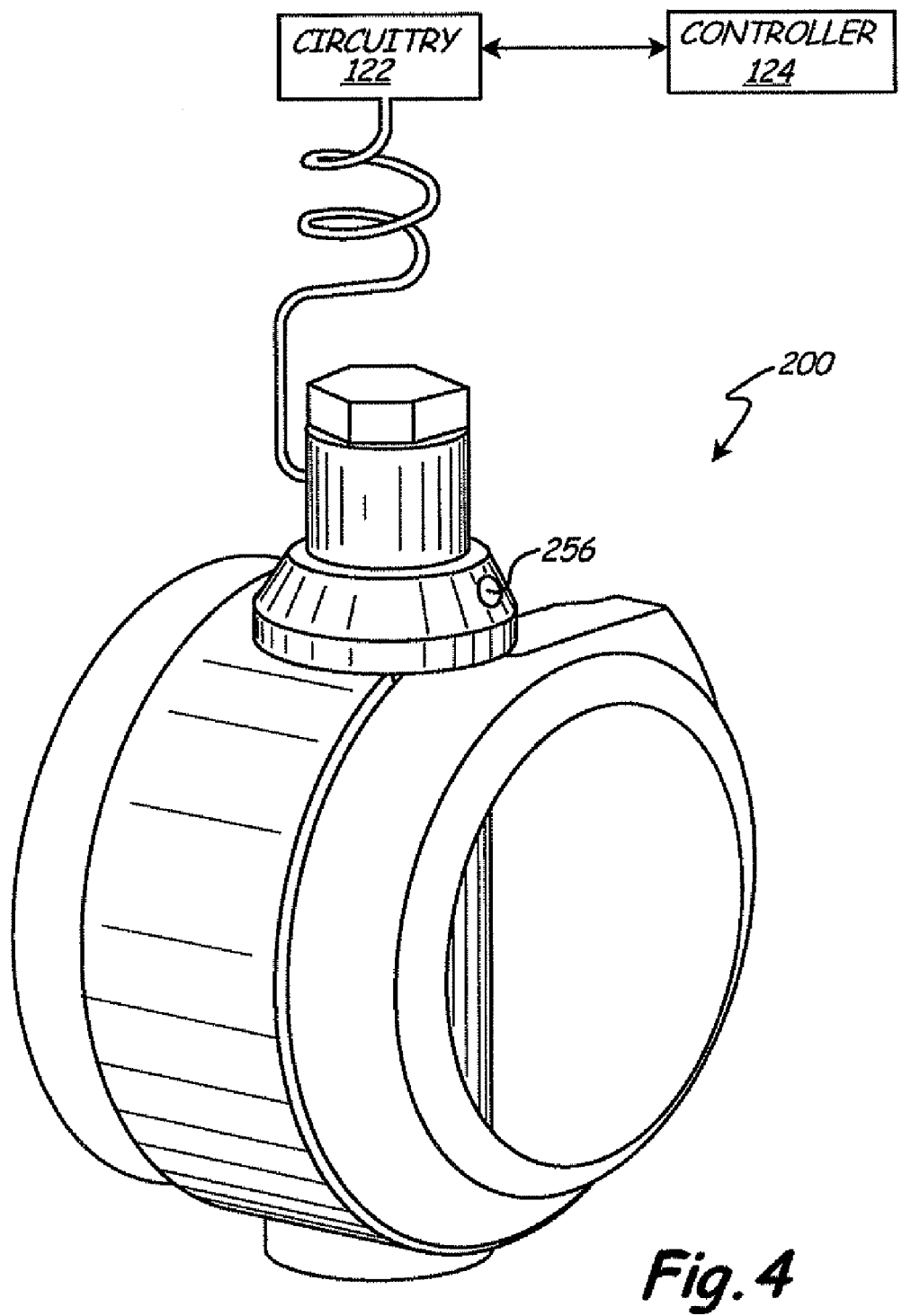
FIG. 4 is a perspective view of a flowmeter under a second embodiment.
Figure 5:
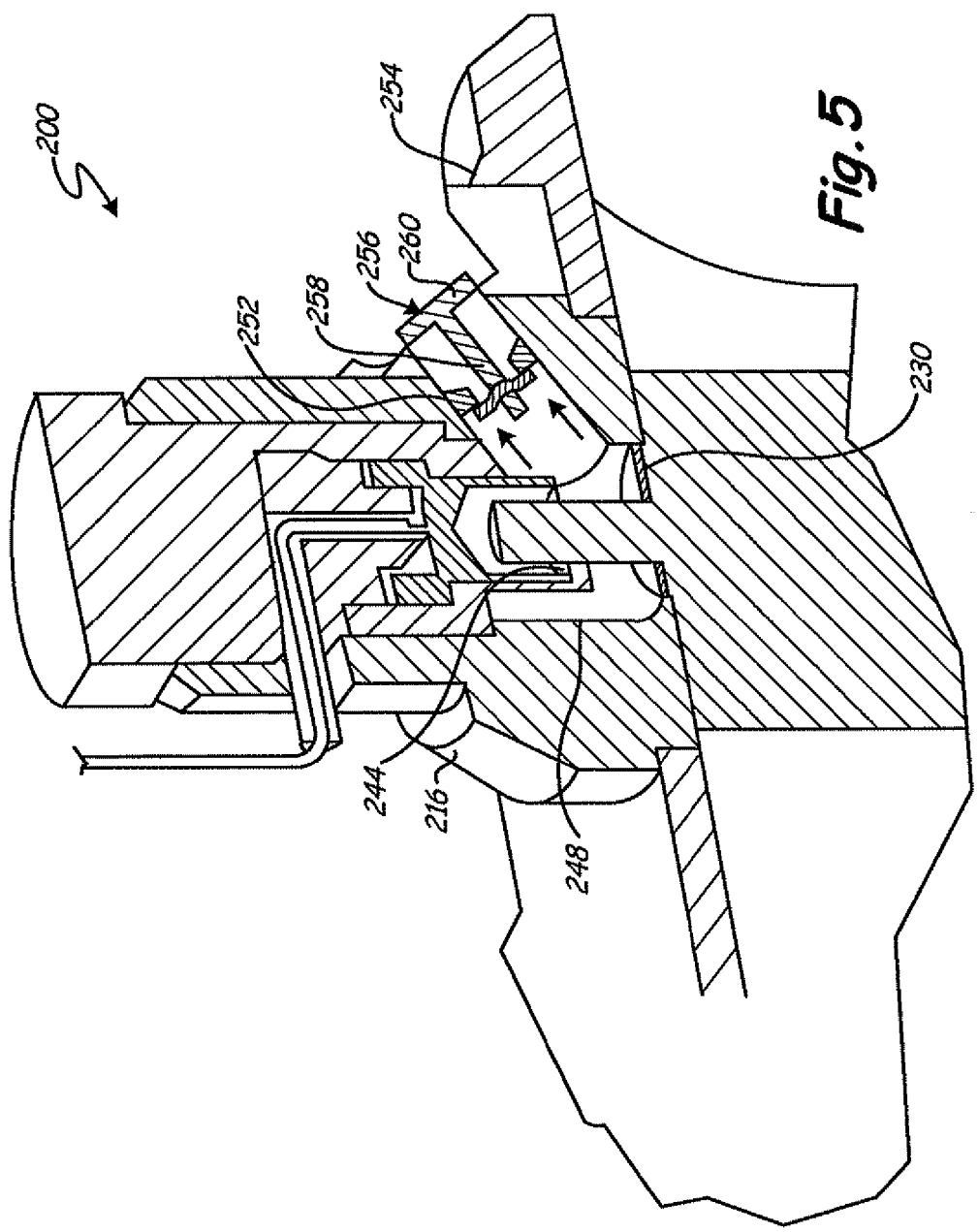
FIG. 5 is a partial sectional view of the flowmeter of FIG. 4 having a visual indicator under a further embodiment.

FIGS. 4 and 5 illustrate a partial view of a flowmeter 200 and a partial sectional view of flowmeter 200, respectively, under further embodiments. Flowmeter 200 includes all of the features of flowmeter 100. However, instead of flowmeter 200 including valve body 156 (FIG. 3), flowmeter 200 includes a pressure sensitive indicator 256 as illustrated in FIGS. 4 and 5. Pressure sensitive indicator 256 is disposed in a pathway 252 that extends between a cavity 248 and an outer surface 254 of sensor body 216. As previously discussed, cavity 248 is defined by sensing device 244, flexure 230 and sensor body 216 Example pressure sensitive indicators include a pressure measuring device that indicates a value of pressure in cavity 248, a diaphragm-type indicator and a visual indicator that is actuated when the pressure in cavity 248 is at least as great as a critical pressure. A pressure that is at least as great as a critical pressure means that process fluid is contained in cavity 248.

Figures 1, 2, 6:
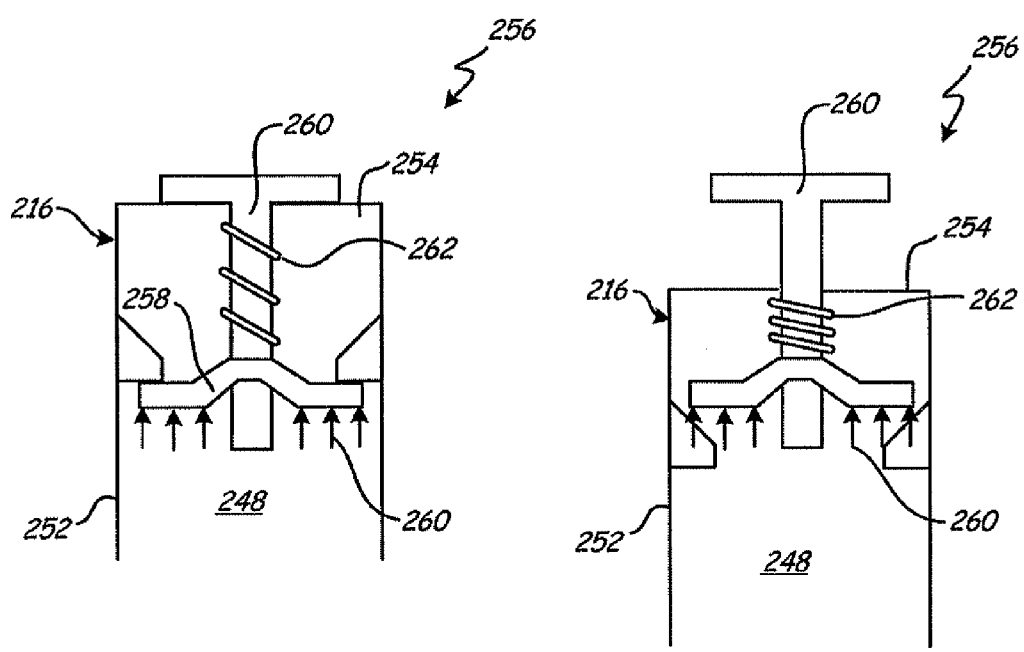

While FIG. 4 illustrates both a pressure sensitive indicator whether a pressure measuring device, a diaphragm-type indicator or a visual pressure sensitive indicator, FIG. 5 specifically illustrates pressure sensitive indicator 256 as being a visual indicator. In FIG. 5, pressure sensitive indicator 256 includes a snap ring 258 coupled to a pin 260. FIGS. 6-1 and 6-2 illustrate diagrammatical views of pressure sensitive indicator 256 disposed in pathway 252. In FIG. 6-1, a pressure of cavity 248 (FIG. 5) is less than a critical pressure. In other words, the pressure in cavity 248 is such that a pressure 260 is not great enough to force snap ring 258 to over come the force exerted by a tension spring 262 that is coupled to pin 260. As such, pin 260 does not protrude from outer surface 254 of sensor body 216. In FIG. 6-2, a pressure of cavity 248 is at least as great as a critical pressure. In other words, the pressure in cavity 248 is such that a pressure 261 is great enough to force snap ring 258 to over come the force exerted by tension spring 262. As such, pin 260 protrudes from outer surface 254 of meter body 216 to indicate that cavity 248 contains process fluid and therefore the flexure has failed.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. For example, while disclosed embodiments are described primarily with reference to process transmitters (industrial field devices) and remote seal systems having no pressure sensors, expansion chambers including expansion inserts can be applied to other transmitter types.

What is claimed is:

1. A vortex flowmeter for measuring process fluid flow comprising:
   a conduit for carrying process fluid;
   a sensing device housed in a cavity of a sensor body coupled to the conduit;
   a flexure disposed in a portion of the conduit, the flexure configured to isolate the process fluid in the conduit from the sensing device;
   a pathway extending from the cavity to an outer surface of the sensor body; and
   a valve body disposed in the pathway.

2. The vortex flowmeter of claim 1, further comprising a post that couples the flexure to the sensing device.

3. The vortex flowmeter of claim 1, wherein the valve body is configured in a closed position during normal operation of the vortex meter.

4. The vortex flowmeter of claim 1, wherein the valve body is configured in an open position for detecting whether some of the process fluid is being improperly contained in the cavity.

5. A vortex flowmeter for measuring process fluid flow comprising:
   a conduit for carrying a process fluid along a conduit axis, the conduit having an area of reduced thickness between exterior and interior surfaces of the conduit;
   a shedding bar disposed in the conduit and including a pivoting member that fluctuates in response to fluctuation in pressures;
   a sensing device housed in a cavity of a sensor body coupled to the conduit, wherein the sensing device is isolated from the process fluid by the area of reduced thickness of the conduit;
   a pathway extending from the cavity to an outer surface of the sensor body; and
   a valve body disposed in the pathway.

6. The vortex flowmeter of claim 5, wherein the valve body is configured in a closed position during normal operation of the vortex meter.

7. The vortex flowmeter of claim 5, wherein the valve body is configured in an open position for detecting whether some of the process fluid is being improperly contained in the cavity.

8. A vortex flowmeter for measuring process fluid flow comprising:
   a conduit for carrying process fluid;
   a sensing device housed in a cavity of a sensor body coupled to the conduit;
   a flexure disposed in a portion of the conduit, the flexure configured to isolate the process fluid in the conduit from the sensing device;
   a device disposed in a pathway extending from the cavity to an outer surface of the sensor body, the device configured for use in determining a presence of the process fluid in the cavity; and
   wherein the device comprises a valve body.

9. A vortex flowmeter for measuring process fluid flow comprising:
   a conduit for carrying process fluid;
   a sensing device housed in a cavity of a sensor body coupled to the conduit;
   a flexure disposed in a portion of the conduit, the flexure configured to isolate the process fluid in the conduit from the sensing device;
   a device disposed in a pathway extending from the cavity to an outer surface of the sensor body, the device configured for use in determining a presence of the process fluid in the cavity;
   wherein the device comprises a pressure sensitive indicator.

10. A vortex flowmeter for measuring process fluid flow comprising:
    a conduit for carrying process fluid;
    a sensing device housed in a cavity of a sensor body coupled to the conduit;
    a flexure disposed in a portion of the conduit, the flexure configured to isolate the process fluid in the conduit from the sensing device;
    a pathway extending from the cavity to an outer surface of the sensor body; and
    a pressure sensitive indicator disposed in the pathway.

11. The vortex flowmeter of claim 10, further comprising a post that couples the flexure to the sensing device.

12. The vortex flowmeter of claim 10, wherein the pressure sensitive indicator comprises a pressure measuring device that indicates a pressure value of fluid in the cavity.

13. The vortex flowmeter of claim 10, wherein the pressure sensitive indicator comprises a visual indicator that is actuated when the pressure in the cavity is at least as great as a critical pressure.

14. The vortex flowmeter of claim 10, wherein the visual pressure indicator comprises a snap ring coupled to a pin under tension, wherein the pin protrudes from the outer surface of the sensor body when the pressure in the cavity is greater than the tension in the pin.

15. A vortex flowmeter for measuring process fluid flow comprising:
    a conduit for carrying a process fluid along a conduit axis, the conduit having an area of reduced thickness between exterior and interior surfaces of the conduit;
    a shedding bar disposed in the conduit and including a pivoting member that fluctuates in response to fluctuation in pressures;
    a sensing device housed in a cavity of a sensor body coupled to the conduit, wherein the sensing device is isolated from the process fluid by the area of reduced thickness of the conduit;
    a pathway extending from the cavity to an outer surface of the sensor body; and
    a pressure sensitive indicator disposed in the pathway.

16. The vortex flowmeter of claim 15, wherein the pressure sensitive indicator comprises a pressure measuring device that indicates a pressure value in the cavity.

17. The vortex flowmeter of claim 15, wherein the pressure sensitive indicator comprises a visual indicator that is actuated when the pressure in the cavity is at least as great as a critical pressure.

18. The vortex flowmeter of claim 15, wherein the visual pressure indicator comprises a snap ring coupled to a pin under tension, wherein the pin protrudes from the outer surface of the sensor body when the pressure in the cavity is greater than the tension in the pin.

* * * * *